Aug. 22, 1933.    E. V. LUDWIG    1,923,940
HEATING MEANS
Filed Jan. 24, 1931
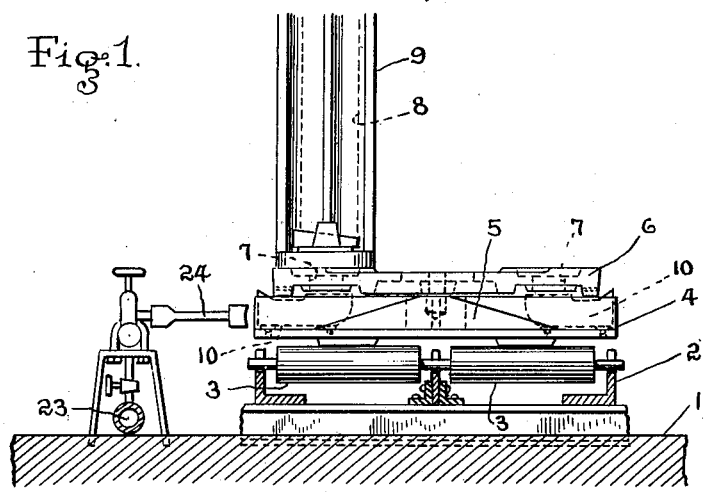
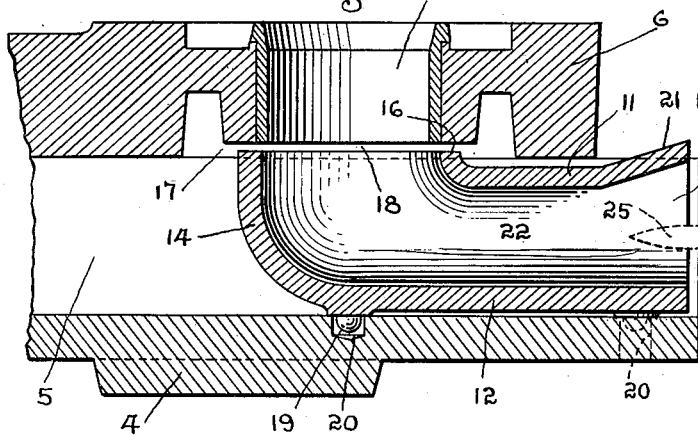
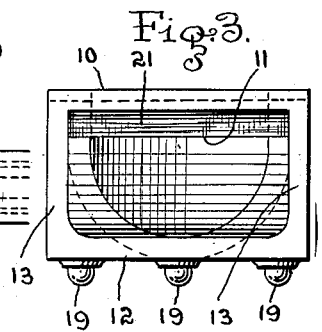
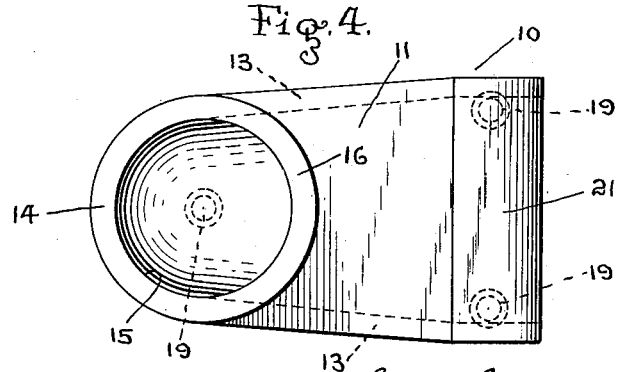
Inventor
Edgar Valentine Ludwig
By his Attorney Patented Aug. 22, 1933

1,923,940

UNITED STATES PATENT OFFICE 1,923,940

HEATING MEANS

Edgar Valentine Ludwig, Woodside, N. Y., assignor to American Radiator Company, New York, N. Y., a Corporation of New Jersey Application January 24, 1931. Serial No. 510,854

6 Claims. (Cl. 22—87)

My invention relates to new and useful improvements in heating means, and more particularly to means for drying and baking the mold forming material, such as molding sand, of a completed mold preparatory to pouring the same.

An object of my invention is to provide means which will convey heating gases into intimate contact with the walls of a mold cavity which are to be dried.

Another object is to provide means which will efficiently transfer the heating gases from their source to the interior of the mold cavity.

Another object is to provide for admission of air with the heated gases to the mold cavity to more effectively dry the mold walls.

Another object is to provide means for skin drying or baking the walls of the mold cavity in order that the period of delay in casting operations, namely, drying the mold, may be reduced to a minimum.

The invention consists in the improved construction and combination of parts, to be more fully described hereinafter, and the novelty of which will be particularly pointed out and distinctly claimed.

In the accompanying drawing, to be taken as a part of this specification, I have fully and clearly illustrated a preferred embodiment of my invention, in which drawing—

Figure 1 is a view in vertical section through a conveyor means and showing a flask mold and the supporting means therefor in elevation, with my heating means operatively in position relative thereto;

Fig. 2 is a detail view in vertical central section through a deflecting member of my invention and showing the same in operative position;

Fig. 3 is a front end view of my deflecting member, and

Fig. 4 is a top plan view thereof.

Referring to the drawing by characters of reference, 1 designates a floor or base structure having a trackway 2 of substantially parallel, laterally positioned rollers 3 extending longitudinally thereof. Cooperable with the rollers and supported thereon is a conveying and supporting member or skid 4 having upstanding ribs 5. Mounted on the member 4 is a flask mold bottom board or member 6 which rests on the ribs 5 so that the members 4 and 6 are substantially parallel and vertically spaced. Through the member 6 at one side of the longitudinal center line thereof, is an aperture 7 which opens into the lower, open end of the mold cavity 8 in a flask mold 9. Positioned beneath the member 6 and in the space between the members 4 and 6, is a deflecting conduit member 10 having top and bottom walls 11, 12 respectively, and rearwardly converging side walls 13 (see Fig. 4). The side and bottom walls 13 and 12 merge into a rear end closure member or wall 14, which is preferably curved in horizontal and vertical cross-section. Through the top wall 11 at the inner end of member 10, is an opening or aperture 15, preferably circular, having the semi-circumference thereof formed by the inner periphery of the wall 14. About the aperture 15 is a vertical flange or bead 16, which is preferably concentric and in registry with the aperture 7. The member 6 may be recessed on its underside, as at 17, concentric with aperture 7, such that the top edge of the flange 16 extends upwardly thereinto, but not so far as to contact the member 6, thus leaving an annular air admission opening 18. On the bottom wall 12 are external feet or positioning members 19, preferably three in number, which seat in sockets 20 in the member 4. The outer end of member 10 preferably extends outwardly beyond the edge of member 6 and substantially to the edge of member 4, and substantially in the vertical plane of the side edge of member 6. The top wall 11 is flared upward and outward, as at 21, to increase the cross-sectional area of the front inlet end of the passage 22 through member 10. At the side of the trackway 2 and extending therealong, is a gas supply conduit 23 having horizontally disposed nozzles or burners 24, of which but one is shown, which are positioned along the trackway. The nozzles 24 are substantially in the horizontal plane of the passage 22 and terminate closely adjacent to the inlet opening of passage 22, so that the flame, designated 25, Fig. 2, issuing from the burners 24, will enter the passage 22. The heating means which I have described, is preferably duplicated at the opposite side of the center line of member 6, as partly indicated in Fig. 1.

The operation is as follows: The gas having been turned on and the burners 24 lighted, a flask mold conveyed along the trackway in step by step movement will successively take position with the passage 22 opposite or in line with a burner 24, and the gases of combustion will heat the air entering the inlet to conduit member 10 and the secondary air entering the aperture 7 through opening 18, and these heating gases will pass upward through aperture 7 into the mold cavity to dry and bake the mold material which forms the walls of the mold. The intensity of the heat will effectively bake the mold walls to provide a thin but very hard "skin", without the necessity of thoroughly drying and baking the mold for the full depth of the mold forming material. This "skin" drying cuts down the time required to provide a mold sufficiently dry and hard for pouring, as compared to baking of the molds in an oven.

What I claim and desire to secure by Letters Patent of the United States is:

1. A device of the character described, comprising a mold bottom member having an aperture therethrough to communicate with a mold cavity of a mold positioned above said aperture, a horizontally disposed deflector conduit member located beneath said bottom member, said conduit member having an inner end located beneath said aperture and having an outer open end to receive heating gases, said conduit member having top, bottom and side walls and a closure wall for the inner end thereof, said top wall having a delivery opening for delivering the heating gases from said conduit member through the aperture of the bottom member into a mold cavity, and means for supplying additional air to the mold cavity and to be heated by the heating gases discharged from the conduit member into said cavity.

2. A device of the character described, comprising a supporting and conveying member, a mold bottom member mounted on said first-named member above the latter and spaced therefrom, said bottom member having an aperture therethrough to communicate with a cavity of a mold positioned above said aperture, a horizontally disposed deflector conduit member located in the space between said conveying member and bottom member, said conduit member having an inner end located beneath said aperture and having an outer open end to receive heating gases, said conduit member having top, bottom and side walls and a closure wall for the inner end thereof, and said top wall having an opening adjacent said closure wall cooperable with said aperture to deliver heating gases from said conduit member upwardly through said aperture into a mold cavity.

3. A device of the character described, comprising a mold bottom member having an aperture therethrough to communicate with a mold cavity of a mold positioned above said aperture, a horizontally disposed deflector conduit member located beneath said bottom member, said conduit member having an inner end located beneath said aperture and having an outer open end to receive heating gases, said conduit member having top, bottom and side walls and a closure wall for the inner end thereof, said top wall having a delivery opening for delivering the heating gases from said conduit member through the aperture of the bottom member into a mold cavity, the said top wall being spaced from said bottom member whereby additional air along with the heating gases from said conduit member can pass through said aperture into the mold cavity.

4. A device of the character described, comprising a supporting and conveying member, a mold bottom member mounted on said first-named member above the latter and spaced therefrom, said bottom member having an aperture therethrough to communicate with a cavity of a mold positioned above said aperture, a horizontally disposed deflector conduit member located in the space between said conveying member and bottom member, said conduit member having an inner end located beneath said aperture and having an outer open end to receive heating gases, said conduit member having top, bottom and side walls and a closure wall for the inner end thereof, and said top wall having an opening adjacent said closure wall cooperable with said aperture to deliver heating gases from said conduit member upwardly through said aperture into a mold cavity, and means to deliver heating gases into the open outer end of said conduit member, said last-named means being spaced from said open outer end whereby additional air will enter the conduit member along with the heating gases.

5. A device of the charatcer described, comprising a horizontally disposed supporting and conveying member, a mold bottom member mounted on said supporting member above the latter and spaced therefrom, said bottom member having an aperture therethrough to communicate with a mold cavity of a mold positioned above said aperture, a horizontally disposed deflector conduit member located in the space between said supporting member and bottom member, said conduit member having an inner end located beneath said aperture and having an open outer end to receive heating gases, said conduit member having top, bottom and side walls, the side walls converging toward the inner end of the conduit member, a closure wall for the inner end of the conduit member, and said top wall having an opening therethrough adjacent said closure wall and registering with said aperture to pass heating gases upwardly through said aperture into a mold cavity, and means to supply heating gases to the open outer end of said conduit member.

6. A device of the character described, comprising a supporting and conveying member, a mold bottom member mounted on said first-named member above the latter and spaced therefrom, said bottom member having an aperture therethrough to communicate with a cavity of a mold positioned above said aperture, a horizontally disposed deflector conduit member located in the space between said conveying member and bottom member, said conduit member having an inner end located beneath said aperture and having an outer open end to receive heating gases, said conduit member having top, bottom and side walls and a closure wall for the inner end thereof, and said top wall having an opening adjacent said closure wall cooperable with said aperture to deliver heating gases from said conduit member upwardly through said aperture into a mold cavity, and cooperating means between said supporting and conveying member and said conduit member for positioning said conduit member in operative relation to the aperture in the mold bottom member.

EDGAR VALENTINE LUDWIG.